United States Patent [19]

Smith

[11] 3,903,543

[45] Sept. 2, 1975

[54] CHARGE TRANSFER DEVICE DECODER AND COMPANDER

[75] Inventor: George Elwood Smith, Murray Hill, N.J.

[73] Assignee: Bell Telephone Laboratories, Incorporated, Murray Hill, N.J.

[22] Filed: Jan. 16, 1974

[21] Appl. No.: 433,822

[52] U.S. Cl. .................. 357/24; 307/304

[51] Int. Cl.[2] .................. H01L 29/78

[58] Field of Search .................. 357/24; 307/304

[56] References Cited

OTHER PUBLICATIONS

J. D. Tartamella, "Control–Charged Device Shift Register" IBM Technical Disclosure Bull., Vol. 15, Oct. 1972, p. 1461.

*Primary Examiner*—Martin H. Edlow
*Assistant Examiner*—Gene M. Munson
*Attorney, Agent, or Firm*—L. H. Birnbaum

[57] ABSTRACT

A charge transfer device is disclosed for performing decoding and companding functions in analog-to-digital conversion. In one embodiment, varying amplitude pulses from a pulse amplitude modulator produce charge carriers in the semiconductor medium which are introduced beneath a first row of charge transfer electrodes. As each potential well beneath an electrode is filled, the charge carriers spill into the adjacent well down the row such that the number of charge packets collected is proportional to the amplitude of the input pulse. Compression of the signal is accomplished by varying the capacitance along the row. The charge packets may be read out serially from this row or transferred laterally to a second row of electrodes and read out from this row in serial fashion. In a further embodiment, equal amplitude pulses produce charge carriers introduced beneath a first row of electrodes which controls the passage of charge from a source of carriers to another row of electrodes. The latter row of electrodes has an increasing capacitance to expand the input signal. The carriers present under the second row are accumulated at the end of the row to produce a signal which is proportional to the number of pulses at the input.

28 Claims, 6 Drawing Figures

CHARGE TRANSFER DEVICE DECODER AND COMPANDER

BACKGROUND OF THE INVENTION

This invention relates to a charge transfer device for performing a decoding and companding function.

In a wide variety of transmission systems, it is necessary to convert an analog signal to a digital signal and vice-versa. This conversion operation requires systems at the transmittal end which will sample an analog signal at specified time intervals, digitize and compress the sampled signal, and finally convert the resulting digit words into a binary signal for transmission. The operation is then reversed at the receiving end. The circuitry required for such operations is fairly sophisticated, complex and expensive. (See, for example, Davis, "An Experimental Pulse Code Modulation System for Short-Haul Trunks," *Bell System Technical Journal*, Vol. XLI, p. 1 (Jan. 1962).) It is therefore desirable to perform some of these functions with a simple and inexpensive device.

SUMMARY OF THE INVENTION

In accordance with the invention, the digitizing and compressing function in an analog to digital conversion operation and the complementary accumulation and expansion function in a digital to analog conversion are performed by a particular design of charge transfer device. In one embodiment, input means are provided for forming charge carriers in the semiconductor medium at the beginning of a row of electrodes in proportion to the amplitude of the input pulse. With a proper bias supplied to the electrodes, the charge carriers will successively fill and overflow into adjacent potential wells beneath the electrodes. The number of charge packets collected will therefore be a function of the amplitude of the input pulse. Compression of the signal is achieved by varying the capacitance along the row. The charge packets are then read out serially from beneath the row or transferred to an adjacent row and read out. The output signal is therefore a number of pulses proportional to the amplitude of the input pulse. For reversing this operation, a further embodiment is described wherein the input means produces charge carriers in proportion to a number of equal amplitude pulses and these carriers are introduced beneath a first row of electrodes. The presence or absence of charge beneath the electrodes of the row determines whether or not charge from a source of carriers will be transferred to beneath a second row of electrodes. The number of charge packets collected beneath the second row is equal to the number of empty packets in the first row and consequently the number of empty packets in the second row is equal to the number of input pulses. An increasing capacitance along the second row also expands the signal. The charge packets beneath the second row are then collected at one end of the row.

BRIEF DESCRIPTION OF THE DRAWING

These and other features of the invention will be delineated in detail in the description to follow. In the drawing.

DETAILED DESCRIPTION OF THE INVENTION

Figure 1:
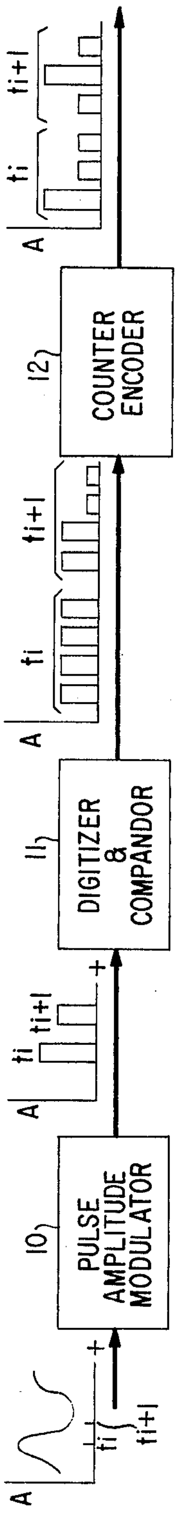
FIG. 1 (PRIOR ART)
FIG. 1 is a schematic representation of a system for converting from an analog to digital signal.

Before proceeding with a discussion of the invention, it is believed helpful for a full understanding of the concepts disclosed herein to discuss the basic operation in converting from an analog to digital signal. This operation is illustrated in the block diagram of FIG. 1. It will be seen that the analog signal, represented by a sketch of amplitude v. time, is fed into a pulse amplitude modulator 10. The function of this system is to sample the input signal at predetermined time intervals (e.g., $t_i$, $t_{i+1}$) and produce separate pulses with amplitudes corresponding to the amplitude of the input as shown by the sketch. The resulting signal is then introduced into the digitizer and compander 11. This operation transforms each input pulse into a number of pulses which is proportional to the amplitude of the input pulse. This is illustrated in the sketch to the right of block 11. It is desirable in these operations to provide better definition for low-level signals at the expense of less definition for high level signals in order to improve the signal-to-noise ratio. This is accomplished by providing a nonlinear coding so that even relatively weak signals are spread over a large number of quantum steps. The digitizing system therefore also compresses the signal. For a more detailed discussion of companding, see Mann, et al. "A Companded Coder for an Experimental PCM Terminal," *Bell System Technical Journal*, Vol. XLI, No. 1, p. 173–226 (Jan. 1962). The resulting signal from the digitizer is then fed into the Counter Encoder, 12, where the digitized signal is converted to a binary signal of ones and zeros, as shown in the sketch to the right of block 12, and the transformation is complete. At the receiving end, this operation is reversed and therefore a system is provided which will accumulate a number of equal amplitude pulses to produce an output pulse proportional thereto and at the same time expand the previously compressed signal. In the context of this application, it will be understood that "decoding and companding" is used as the generic description covering digitizing and compressing or accumulating and expanding a signal.

In the present application, it is proposed that the decoding and companding function of block 11 and its antithesis be performed by a charge transfer device in accordance with the invention. "Charge Transfer Device" (CTD) is the well-known generic description for devices which store and transfer charge carriers in a storage medium by means of appropriate potentials applied to series of electrodes disposed upon an insulating layer overlying one surface of the medium. These devices may be of the charge coupled (CCD) or bucket brigade (BBD) type. In the basic bucket brigade device, heavily doped junction regions are provided in the storage medium beneath each electrode and extending slightly into the area below an adjacent electrode in the charge transfer path. When an electrode is pulsed, the junction region immediately under it is reverse biased and the channel between this region and its neighbor is inverted to permit the transfer of charge. Thus, mobile charge carriers are stored in heavily doped regions as majority carriers and transferred through the channels as minority carriers. The basic charge coupled device stores charge carriers under depletion biased electrodes and transfers the charge carriers by creating a succession of potential wells at the storage medium surface along the transfer path. Charge is therefore stored and transferred in the form of discrete packets of minority carriers in the medium.

Figure 2:
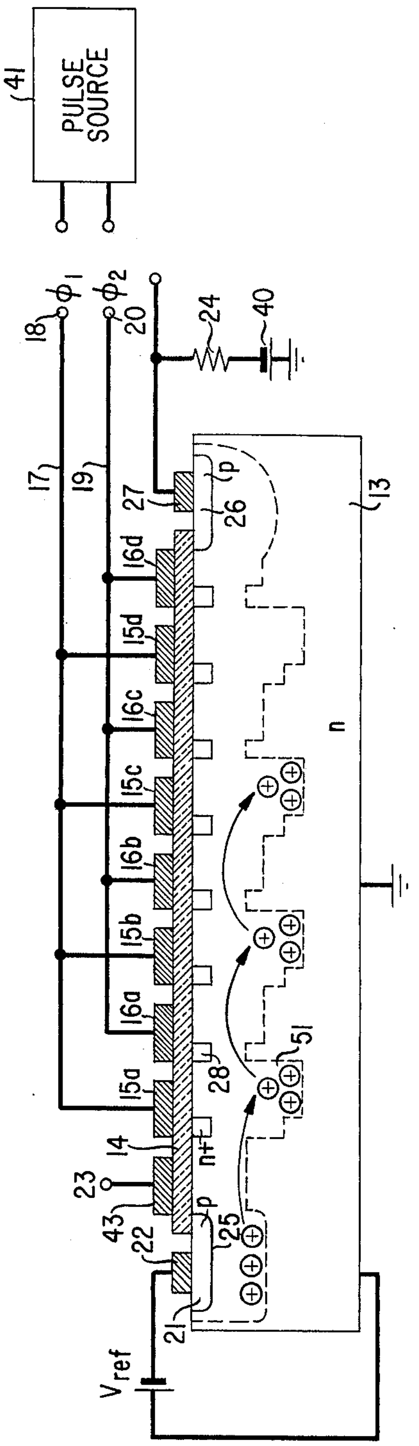
FIG. 2 is a cross-sectional view, partly schematic, of a device for digitizing and compressing a signal in accordance with one embodiment of the invention.

The device in accordance with one embodiment of the invention is illustrated in the cross-sectional, partly schematic view of FIG. 2. Shown is a charge coupled device, but it will be appreciated that the principles discussed herein are equally applicable to bucket brigade devices. The device comprises an n-type semiconductor medium, 13, an insulating layer, 14, overlying the major portion of one surface of the medium and a first row of electrodes, 15 *a* – *d* and 16 *a* – *d*, which are adapted to form potential wells in the medium thereunder for storage and transfer of charge carriers in accordance with the charge coupled device concept. It will be appreciated that although an n-type storage medium is shown, a p-type medium could also be used with a reversal of all polarities to be described in this embodiment. Electrodes 15 *a* – *d* are coupled by means of conduction path 17 to terminal 18 where a pulse train $\phi_1$ is supplied by some source illustrated as block 41, and similarly electrodes 16 *a* – *d* are coupled by path 19 to terminal 20 where a pulse train $\phi_2$ is supplied by source 41. Included beneath each electrode in the medium is a surface charge region, 28, of $n^+$ conductivity type in order to provide an asymmetric potential for two-phase operation as is well known in the CCD art. The input means at the beginning of the row comprises a localized surface region of p-type impurities, 21, contacted by electrode 22 to a source of an appropriate reference potential, $V_{ref}$, with respect to ground. The input pulse from the pulse amplitude modulator (10 of FIG. 1) may be applied at terminal 23 to electrode 43 in order to provide a conductive channel for minority carriers from p-n junction 25 to the first storage site during the time tht a pulse is supplied. Alternatively, as will be appreciated in the art, the analog signal may be applied directly to electrode 43 without the necessity of providing a separate pulse amplitude modulator.

It is known that such an arrangement will introduce minority charge carriers, in this case holes, into the medium in proportion to the amplitude and duration of the input signal. It will be appreciated that the means just described to generate carriers in response to an electrical signal is only one of many which are well-known in the art and the input means shown should be considered primarily illustrative. (See, for example, U.S. patent application of W. S. Boyle and G. E. Smith, Ser. No. 196,933 filed Nov. 9, 1971, now U.S. Pat. No. 3,858,232). At the other end of the row is a localized region, 26, of p-type impurities contacted by electrode 27 and reverse biased by some means, 40, through load resistor 24 in order to collect charge carriers. The precise function of this detection means will be described below. Again, several alternative collection means well-known in the art may be employed instead.

Figure 3:
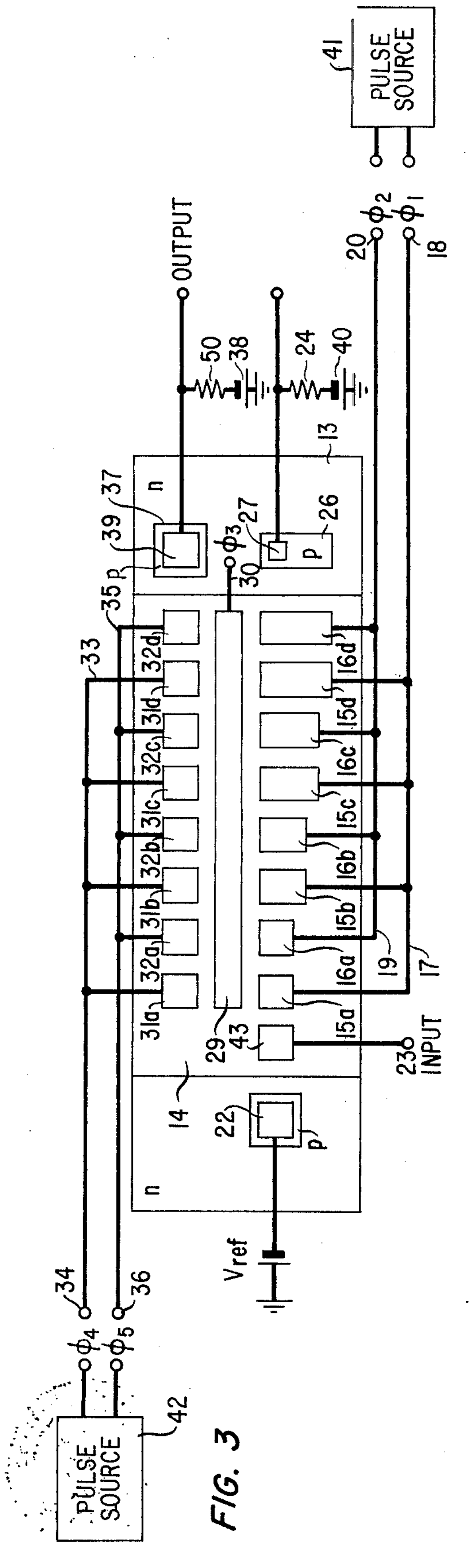
FIG. 3 is a plan view, partly schematic, of a device in accordance with the same embodiment.

The remainder of the device is illustrated in the partly-schematic plan view of FIG. 3. It will be seen that adjacent to the first row of electrodes 15 *a* – *d*, 16 *a* – *d*, is an elongated electrode, 29, also disposed upon the insulating layer 14. This electrode is pulsed by pulse train $\phi_3$ through conduction path 30. Electrode 29 is designed to transfer the charge from the first row to the next adjacent row of electrodes 31 *a* – *d* and 32 *a* – *d*. Consequently, it will be understood that appropriate means are required in order to define the discrete charge transfer paths under this electrode, such as for example, vertical strips of $n^+$-type impurities in the medium. Such means are well-known in the art and are not shown in the figure for the sake of clarity. The electrodes 31 *a* – *d* of the second row are coupled by conduction path 33 to terminal 34 where a pulse train $\phi_4$ is supplied by source 42 and electrodes 32 *a* – *d* are coupled by conduction path 35 to terminal 36 where pulse train $\phi_5$ is supplied. The output means associated with this row is essentially the same as the detection means previously described. It comprises a localized region of p-type impurities 37 in the medium which is reverse biased by some means 38 through load resistor 50 applied to electrode 39 so that a charge carrier packet can be collected and appear at the output as a pulse. Again, this detection means can be any of a number of structures known in the art.

It will be noted in this view that the area of electrode pairs of the first row increases the farther away from the input means they are situated. The function of this design will be discussed below.

The operation of the device will now be described by first referring back to FIG. 2 in conjunction with the pulse diagrams of FIG. 4. At time $t_o$, potential wells are formed under electrodes 15 *a* – *d* by providing a negative bias of $V_{p_1}'$ from pulse train $\phi_1$. Electrodes 16 *a–d* are biased by a negative potential $V_{r_1}$ which is less negative than $V_{p_1}'$. The resulting surface potential in the medium at $t_o$ is illustrated by the broken line 51. At the same point in time, a negative pulse is provided at terminal 23. The resulting bias of electrode 43 permits charge carriers, in this case holes represented by ⊕ in the figure, generated by junction 25 to enter beneath the first row of electrodes, the number of charge carriers being proportional to the amplitude and duration of the pulse. The holes will first be attracted to the potential minimum formed under electrode 15a. The carriers will continue to collect in this region until the surface potential reaches that of the area under adjacent electrode 16*a*, specifically the potential under surface region 28. (The change in surface potential is not shown in the figure for the sake of clarity in the illustration.) At this point, any further carriers collected will "spill over" into the next region of potential minimum, i.e., the area under electrode 15*b*. Once again, when the surface potential under 15*b* reaches that under 16*b*, the added carriers spill into the area under 15*c*, and so on. It is assumed for the purpose of illustration that the input signal has a magnitude which produces carriers sufficient to completely fill the sites under 15*a* and 15*b*, and at least partially fill the site under 15*c*. It will be seen that the number of charge packets collected in this row of electrodes is proportional to the amplitude of the input pulse, and so the device performs a digitizing or quantizing function.

As mentioned previously, it is desirable to compress the signal by providing a finer scale for low level signals than higher level signals. This is accomplished in accordance with the invention by providing an increasing capacity for charge collection at the storage sites at an increasing distance from the input means. It is known that the amount of charge, $Q_i$, collected in the medium beneath an electrode biased by a voltage $V_p$ is:

$$Q_i = V_p C_i \quad (1)$$

where $C_i$ is the capacitance of the metal-oxide-semiconductor combination. It is also known that capacitance will vary in accordance with the function:

$$C_i = f(N_D, d, A, Q_{ss}) \quad (2)$$

where $Q_{ss}$ is the fixed-charge in the insulator, $N_D$ is the doping density in the semiconductor, $d$ is the thickness of the insulator, and A is the area of the electrode. Therefore, the charge collecting capacity is increased along the row by increasing the capacitance of the MOS devices which store charge along the row, or by increasing the voltages applied to the electrodes along the row.

As will be seen by referring to FIG. 3, the capacitance is increased along the row by providing increasing area of the electrodes 15 *a – d* (along with their corresponding electrodes 16 *a – d*). The ratio of the areas of the electrodes can be designed to fit particular needs. In a typical transmission system, a companding ratio of 100–1 is desirable. (This ratio may be defined as the ratio of the storage capacity of the last storage site to that of the first storage site in the row.) It will be realized from Eq. (2) that several other methods are available for increasing the storage capacity along the row. For example, a gradient of fixed charge may be implanted at the surface of the semiconductor or in the oxide over the entire area of the first row or localized in the area below each collecting electrode 15 *a – d*. Alternatively, the oxide thickness may be sloped so as to decrease along the row. Indeed, a combination of these structures may be employed in a single device. Furthermore, the same thing could be accomplished by providing an increasing voltage applied to the electrodes along the row.

At time $t_1$ all the charge has been collected and it is desired to read out the charge packets by the charge coupled mechanism. It is desirable for utmost accuracy not to read out the charge serially since the small packets of charge at the beginning of the row would likely be obscured when transferring through the much higher capacity sites at the end of the row. Consequently, the parallel transfer arrangement of FIG. 3 is employed. During the period of charge collection ($t_o$ to $t_1$) electrode 29 had been held at a sufficiently low voltage $V_{r_2}$ ($|V_{r_2}| < |V_{r_1}|$) such that a barrier existed between the first row and the second row of electrodes. In order to transfer charge, $\phi_3$ now supplies a voltage of $V_{p_2}$ to electrode 29, while $\phi_4$ supplies a voltage $V_{p_1}$ to electrodes 31 *a – d* as shown in FIG. 4. $V_{p_2}$ is sufficient to deplete the area under electrode 29 so that by time $t_2$ the charge under electrodes 15 *a – d* is transferred to beneath electrodes 31 *a – d*, at which time electrode 29 is returned to $V_{r_2}$. Any packets residing under electrodes 31 *a – d* are then transferred to the right by sequentially pulsing electrodes 31 *a – d* and 32 *a – d* from time $t_3$ to $t_4$. As the packets are sequentially transferred to the localized p region 37, a current pulse appears at the output terminal. The output signal is therefore a series of pulses whose number is proportional to the number of packets of charge collected and therefore proportional to the amplitude of the original input signal.

It will be noted as shown in FIG. 3 that the electrodes 31 *a – d* are of a smaller size than the corresponding electrodes 15 *a – d* and therefore have less charge collecting capacity. Consequently, some charge will be left behind in electrodes 15 *a – d* after the parallel transfer. Since it is only the number of charge packets collected and not their respective quantity which is important, this situation is not undesirable. However, some means should be employed to remove this remaining charge before the next input pulse is supplied to the device. This charge is removed by sequentially pulsing electrodes 15 *a – d* and 16 *a – d* from $t_3$ to $t_4$ in charge coupled fashion to serially transfer the charge to localized p region 26. The charge is therefore collected by the combination of p region 26 and reverse-biased electrode 27, and the row is ready to collect charge from the next signal. Alternatively, the excess charge can be eliminated by collapsing all depletion regions under the first row and letting the charge recombine in the bulk of the semiconductor, or, in a further embodiment, by laterally transferring the charge to a sink provided in the medium.

Figure 4:
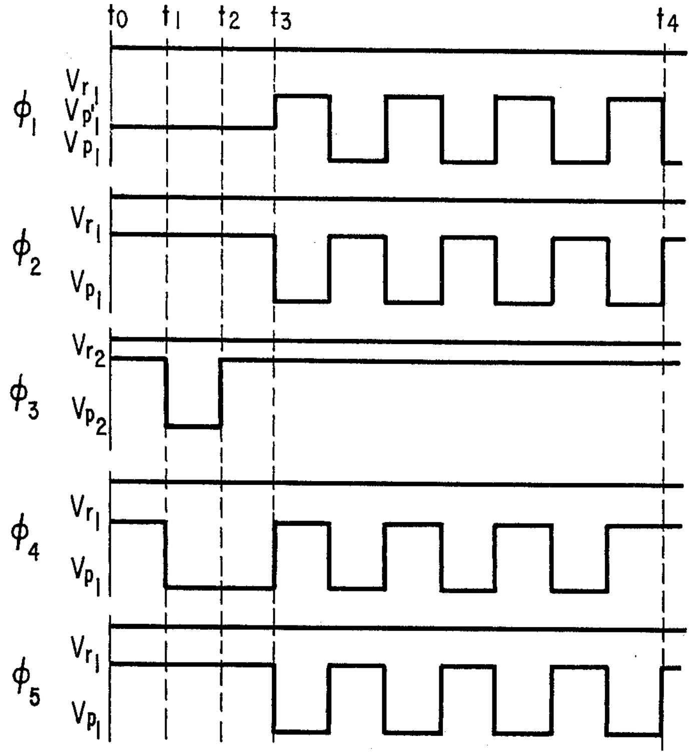
FIG. 4 is a diagram of sample pulse trains required to operate the device in accordance with the same embodiment.

It will be understood that the pulse program shown in FIG. 4 is primarily illustrative. For example, in actual practice it is usually preferable for good transfer efficiency to provide more gradually increasing and decreasing pulses in sawtooth fashion with a proper overlap of pulses to adjacent electrodes. The program itself could be altered in many ways. For example, it is possible to keep electrodes 31 *a – d* at voltage $V_{p_1}$ during the collection of charge carriers in electrodes 15 *a – d* since the potential barrier created by electrode 29 would prevent any transfer between the two rows. It is also possible for the same reason to collect charge carriers under electrodes 15 *a – d*, while the charge packets from the previous signal are being read out serially from electrodes 31 *a – d* thereby providing a faster operation (assuming, of course, that excess charge from the previous signal has been removed by recombination in the bulk).

Various additional modifications of the basic structure described are possible. Although the structure shown in FIG. 3 will provide a more accurate measure of the collected charge packets, it is equally within the context of the invention to have only one row of electrodes such as 15 *a – d* and 16 *a – d* and read out the charge serially from beneath that row. Such a device might sacrifice some transfer efficiency but have the advantage of a simpler structure. The excess charge could be removed in such a device at the output end by providing another localized p region adjacent to region 26 with another gate electrode disposed upon an insulator over the area between the two p regions to essentially form an IGFET. The first p region would detect a packet as before, and any excess charge would be gated to the second p region for collection.

Figure 5:
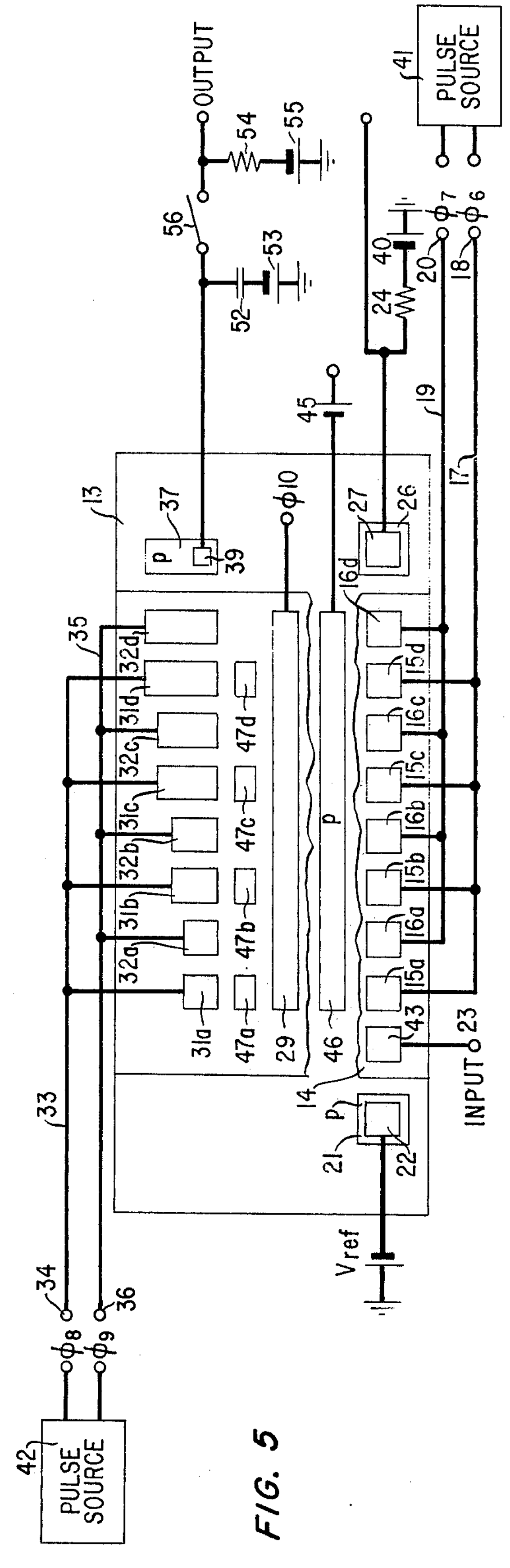
FIG. 5 is a plan view, partly schematic, of a device for accumulating and expanding a signal in accordance with a further embodiment.

It is also possible with some alterations to provide for accumulation and expansion of an input signal and thereby reverse the operation previously described. Such a device is shown in plan view in FIG. 5, with elements equivalent to those of FIG. 3 similarly numbered. It will be seen that the first row (15 *a – d*, 16 *a – d*) comprises electrodes of equal size, while the second row (31 *a – d*, 32 *a – d*) comprises electrodes of increasing size for increased capacitance. Another important modification is the addition of p-type region 46 in the medium adjacent to the first row and a third row of electrodes, 47 *a* – *d*, between this p region and the second row 31 *a* – *d*, 32 *a* – *d*. Although not seen in this view, localized surface regions of impurities of p conductivity types are provided in the medium beneath each of the storage electrodes 15 *a* – *d*. The function of these regions is to sense whether or not a packet of charge resides under the electrode. These regions are electrically coupled to a corresponding electrode of the third row, 47 *a* – *d*. (For a more complete discussion of the operation of such sensing regions for use in regenerator circuits, see, for example, U.S. Pat. application Ser. No. 114,624, filed Feb. 11, 1971 and assigned to the present assignee.) The p-type region 46 is reverse-biased by some means such as battery 45, so as to act as a source of minority carriers, which in this case are holes.

Figure 6:
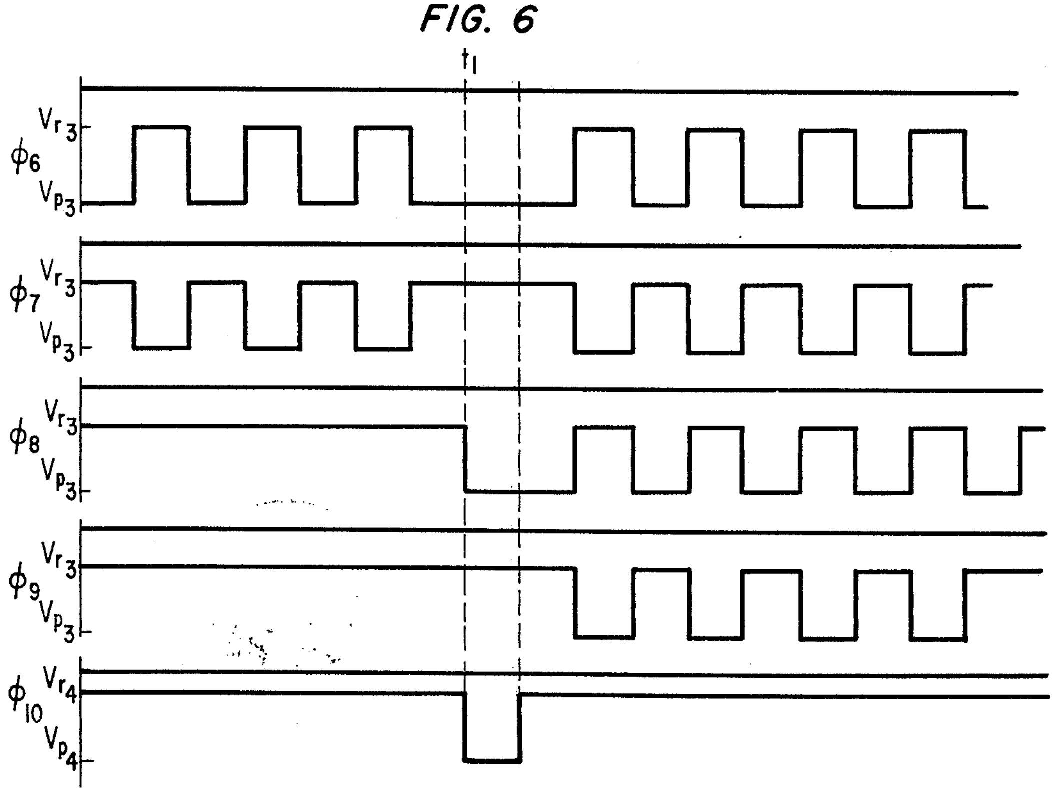
FIG. 6 is a diagram of sample pulse trains required to operate the device in accordance with the same embodiment.

In operation, the input signal which consists of a number of equal amplitude pulses for each time slot e.g., $t_i$ and $t_{i+1}$ as in FIG. 1) is inverted so that wherever there was a pulse there now appears an absence of a pulse and wherever there was an absence of a pulse is now a pulse. This is accomplished by means well known in the art, for example, by applying the input signal to the gate of an IGFET with a floating source and a reverse-biased drain and detecting the signal at the drain. The resulting signal is applied to terminal 23 so that charge carriers are introduced as before into the medium. In this embodiment, however, the charges are moved to storage sites beneath the first row of electrodes by pulsing electrodes 15 *a* – *d* and 16 *a* – *d* in charge coupled fashion with pulse trains $\phi_6$ and $\phi_7$ illustrated in FIG. 6. The number of storage sites filled beneath 15 *a* – *d* will, of course, be proportional to the number of pulses introduced at the input. It is assumed that the storage sites under electrodes 15 *c* – d are filled while the sites under 15 *a* – *b* are empty (i.e., the signal consists of two pulses followed by two absences of pulses). While the charge is being introduced into the first row, electrode 29 is held at a sufficiently low potential, $V_{r4}$, such that no charge can transfer to the areas under electrodes 31 *a* – *d*. After the read-in of information is complete, however, electrode 29 is held at a high potential $V_{p4}$ which will allow transfer of charge. The potential $V_{p3}$ applied to the storage electrodes of the first row (15 *a* – *d*), and the capacitances of these electrodes as well as of the electrodes of the third row (47 *a* – *d*) are chosen so that the potential under an electrode coupled to a storage site which has not accumulated any charge (in this case 47 *a* – *b* and 15 *a* – *b* respectively) is sufficient to allow transfer of charge from source 46 to a corresponding electrode in the second row (in this case 31 *a* – *b*). However, when charge is present beneath an electrode of the first row (15 *c* – *d*), the surface potential there is lowered sufficiently so that the surface potential beneath the electrode of the third row coupled thereto (47 *c* – *d*) is lowered below the threshold for depletion and so no charge can flow to the corresponding electrodes of the second row (31 *c* – *d*). Putting it another way, since electrodes 47 *a* – *d* are each electrically coupled to a storage site under 15 *a* – *d* respectively, the former electrodes (47 *a* – *d*) will be at the same potential as the storage sites under the latter electrodes. As long as no charge enters the storage sites under 15 *a* – *d*, electrodes 47 *a* – *d* are at a sufficiently negative potential to create a channel for the transfer of minority carriers from source 46 to beneath the electrode row 31 *a* – *d*. If, however, when the signal is introduced, a charge packet resides in any of the storage sites, the potential of that site will become less negative and so will the potential of the electrode from row 47 *a* – *d* which is coupled thereto. This lowering of potential will close off the channel between source 46 and the corresponding electrode of the row 31 *a* –*d*. Thus, in this example, charge carriers are collected under 31 *a* – *b*, in sufficient quantity to completely fill the storage site thereunder, while no charge is collected under electrode 31 *c* – *d*. The charge packets collected under the second row (31 *a* – *d*) are therefore an inverted representation of the number of charge packets collected under the first row and therefore a direct representation of the number of pulses of the input signal which had been inverted. The input signal has also been expanded in the second row due to the increasing capacitance of the electrodes in that row in order to reverse the compression operation effected at the transmittal end of the system. The charge packets can then be transferred serially to the output end, which includes a simple circuit for adding the current pulses resulting from each packet. Briefly, voltage source 53 charges one of the capacitor plates of capacitor 52 to a negative potential $V_1$ while, with switch 56 closed, the other plate is charged to a negative potential of $V_2$ by voltage source 55 ( $|V_1| < |V_2|$ ). With switch 56 open, any positive charge appearing at p-region 37 will make capacitor 52 more positive. Thus, the switch is left open until all charge beneath row 31 *a* – *d* is read out. When the switch is closed, current will flow through resistor 54 in proportion to the total positive charge collected by capacitor 52 (i.e., in proportion to the difference between the final potential and the initial potential $V_2$ of the capacitor 52.) The resulting output is therefore a single pulse whose amplitude is proportional to the number of input pulses introduced, thereby reversing the operation previously described with reference to FIGS. 2 – 4. Sample pulse trains $\phi_6$ – $\phi_{10}$ needed to so operate the device are shown in FIG. 6 without further discussion. It will be appreciated in the device of FIG. 5 that the electrode 29 can be eliminated if means are provided for switching region 46 to a ground potential when it is desired not to transfer carriers therefrom.

It should be clear that very simple devices have been shown for the purpose of describing the principles of the invention. Actual devices would comprise many more electrodes in a row. Also, the logic circuitry needed for the operation of the devices in accordance with the invention may take many forms which are all within the knowledge of those skilled in the art and such circuitry is therefore not described. It is also known that such logic circuitry can be manufactured on the same semiconductor substrate as the basic device components shown in FIGS. 3 and 5. Although a two-phase addressing scheme is shown for transferring charge serially in each row, it will be clear that any number of phases may be used in accordance with known charge coupled principles. Extension of these principles to bucket brigade devices should also be straight-forward. For example, companding in such a device could be accomplished by providing increasing area at the heavily doped regions which store mobile carriers or simply a successively higher concentration of fixed charge in these regions.

Various additional modification and extensions will become apparent to those skilled in the art. All such variations which basically rely on the teachings through which the invention has advanced the art are properly considered within the spirit and scope of the invention.

What is claimed is:

1. A charge transfer device for decoding and companding an input signal comprising a semicondrictor charge storage medium, an insulating layer covering at least a portion of one surface of said medium, input means for generating mobile charge carriers in said medium in response to said input signal, and a first row of electrodes disposed on said insulating layer adapted to form in the medium thereunder a row of storage sites for the collection of said mobile carriers when a suitable bias is supplied to the electrodes wherein each storage site has a greater storage capacity for mobile carriers than the preceding site in the row disposed closer to said input means.

2. The device according to claim 1 further comprising a second row of electrodes disposed on said layer in close proximity to the first row and positioned so as to receive in the medium thereunder mobile charge carriers from said storage sites.

3. The device according to claim 1 further comprising a second row of electrodes disposed on said layer adapted to form a second row of storage sites in the medium thereunder positioned so as to receive in the medium thereunder mobile charge carriers from said input means, a source of mobile charge carriers in said medium and a third row of electrodes coupled to corresponding storage sites of said second row and adjacent to said first row for controlling the transfer of charge carriers from said source to said first row of storage sites in response to the carriers collected in said second row of storage sites.

4. The device according to claim 1 further comprising means for biasing said first row of electrodes so as to form in the medium thereunder said row of storage sites.

5. The device according to claim 2 further comprising means for biasing said second row of electrodes so as to effect transfer of mobile charge carriers from said storage sites to the medium beneath said second row.

6. The device according to claim 3 further comprising means for biasing said second row so as to form said second row of storage sites in the medium thereunder and such that the electrodes of said third row will permit transfer of mobile carriers from said source when no charge is collected in the storage sites of the second row to which they are coupled and will block transfer when charge is collected.

7. The device according to claim 1 further comprising output means at one end of said first row and means for sequentially biasing said first row so as to transfer said mobile charge carriers thereunder in said storage sites to said output means.

8. The device according to claim 1 wherein each electrode of said first row adapted to form a storage site in the medium thereunder has a greater area than the preceding electrodes in the row adapted to form storage sites in the medium which are closer to said input means.

9. The device according to claim 1 wherein the thickness of the portion of the insulating layer below each electrode of the first row adapted to form a storage site has a smaller thickness than the portion of the insulating layer below the preceding electrodes in the row adapted to form storage sites which are closer to said input means.

10. The device according to claim 1 wherein the concentration of fixed charge in the insulator beneath each electrode adapted to form a storage site is greater than the concentration of fixed interface charge below preceding electrodes in the row adapted to form storage sites which are closer to said input means.

11. The device according to claim 1 wherein the concentration of fixed charge in the semiconductor beneath each electrode adapted to form a storage site is greater than the concentration of fixed charge below preceding electrodes in the row adapted to form storage sites which are closer to said input means.

12. The device according to claim 4 wherein the bias supplied to each electrode adapted to form a storage site is greater than the bias supplied to preceding electrodes in the row adapted to form storage sites in the medium which are closer to said input means.

13. A charge transfer device for digitizing and compressing an analog signal comprising a semiconductor charge storage medium, an insulating layer covering at least a portion of one surface of said medium, input means for generating mobile charge carriers in said medium in response to said signal, a first row of electrodes disposed on said insulating layer one end of which is in close proximity to said input means and means for biasing said first row of electrodes so as to form in the medium thereunder a row of storage sites separated by potential barriers such that mobile charge carriers from said input means will successively fill the sites, wherein each storage site has a greater storage capacity for mobile charge carriers than the preceding sites in the row closer to said input means.

14. The device according to claim 13 further comprising detection means at the end of said first row away from said input means, and means for sequentially biasing said electrodes so as to transfer said stored charge carriers to said detection means.

15. The device according to claim 13 further comprising a second row of electrodes disposed on said layer in close proximity to the first row and means for biasing said second row so as to form in the medium thereunder a second row of storage sites positioned to receive mobile charge carriers from each of said first row of storage sites.

16. The device according to claim 15 further comprising detection means at one end of said second row of electrodes, means for biasing said first and second rows of electrodes so as to transfer mobile carriers from said first row of storage sites to corresponding storage sites of said second row, and means for sequentially biasing the electrodes of said second row so as to transfer said mobile carriers to said detection means.

17. The device according to claim 16 further comprising detection means at the end of said first row removed from said input means, and means for sequentially biasing the electrodes of said first row so as to transfer to said detection means excess charge carriers remaining in said storage sites after transfer of carriers to said second row.

18. The device according to claim 13 wherein each electrode of the first row adapted to form a storage site in the medium thereunder has a greater area than the preceding electrodes in the row adapted to form storage sites in the medium which are closer to said input means.

19. The device according to claim 13 wherein the thickness of the portion of the insulating layer below each electrode of the first row adapted to form a storage site has a smaller thickness than the portion of the insulating layer below the preceding electrodes in the row adapted to form storage sites which are closer to said input means.

20. The device according to claim 13 wherein the concentration of fixed charge in the insulator beneath each electrode of the first row adapted to form a storage site is greater than the concentration of fixed charge below preceding electrodes in the row adapted to form storage sites which are closer to said input means.

21. The device according to claim 13 wherein the concentration of fixed charge in the semiconductor beneath each electrode of the first row adapted to form a storage site is greater than the concentration of fixed charge below preceding electrodes in the row adapted to form storage sites which are closer to said input means.

22. The device according to claim 13 wherein the bias supplied to each electrode of the first row adapted to form a storage site is greater than the bias supplied to preceding electrodes in the row adapted to form storage sites in the medium which are closer to said input means.

23. A charge transfer device for accumulating and expanding a signal in the form of a series of equal amplitude input pulses comprising a semiconductor charge storage medium, an insulating layer covering at least a portion of one surface of said medium, input means for generating mobile charge carriers in said medium in response to said series of input pulses, a first row of electrodes disposed on said insulating layer one end of which is in close proximity to said input means, means for biasing said first row of electrodes so as to form in the medium thereunder a first row of storage sites for collection of mobile charge carriers and so as to transfer said mobile carriers from said input means to said first row of storage sites, a second row of electrodes disposed on said insulating layer positioned parallel to said first row and electrically coupled to the storage sites of said first row, a source of mobile charge carriers positioned between said first and second rows of electrodes, a third row of electrodes disposed on said insulating layer adjacent to said second row, means for biasing said third row of electrodes to form a second row of storage sites in said medium positioned so as to receive mobile charge carriers from said source through the surface beneath said second row of electrodes and wherein each storage site has a greater storage capacity for mobile charge carriers than the preceding sites in the row closer to said input means, detection means at one end of said third row including means for producing a signal which is proportional to the sum of all charge residing in the storage sites beneath the third row and means for sequentially biasing said third row of electrodes so as to transfer mobile carriers from said second row of storage sites to said detection means.

24. The device according to claim 24 wherein each electrode of the third row adapted to form a storage site in the medium thereunder has a greater area than the preceding electrodes in the row adapted to form storage sites in the medium which are closer to said input means.

25. The device according to claim 23 wherein the thickness of the portion of the insulating layer below each electrode of the third row adapted to form a storage site has a smaller thickness than the portion of the insulating layer below the preceding electrodes in the row adapted to form storage sites which are closer to said input means.

26. The device according to claim 23 wherein the concentration of fixed charge in the insulator beneath each electrode of the third row adapted to form a storage site is greater than the concentration of fixed charge below preceding electrodes in the row adapted to form storage sites which are closer to said input means.

27. The device according to claim 23 wherein the concentration of fixed charge in the semiconductor beneath each electrode of the third row adapted to form a storage site is greater than the concentration of fixed charge below preceding electrodes in the row adapted to form storage sites which are closer to said input means.

28. The device according to claim 23 wherein the bias supplied to each electrode of the third row adapted to form a storage site is greater than the bias supplied to preceding electrodes in the row adapted to form storage sites in the medium which are closer to said input means.

* * * * *